United States Patent [19]

Reynolds, Jr. et al.

[11] 4,419,319

[45] Dec. 6, 1983

[54] PREFORM STRUCTURE

[75] Inventors: Virgil C. Reynolds, Jr., Yorktown, Ind.; Daryl D. Cerny, Greenville, Ohio

[73] Assignee: Ball Corporation, Muncie, Ind.

[21] Appl. No.: 291,540

[22] Filed: Aug. 10, 1981

[51] Int. Cl.[3] .......................... B29C 17/03; B29C 3/00
[52] U.S. Cl. .................................... 264/292; 264/322; 264/325; 264/DIG. 64
[58] Field of Search ............... 264/322, 325, DIG. 64, 264/79, 292

[56] References Cited

U.S. PATENT DOCUMENTS 3,739,052 6/1973 Ayers et al. ....................... 264/322
4,014,970 4/1977 Jahnle ................................. 264/322

Primary Examiner—Thomas P. Pavelko
Attorney, Agent, or Firm—Gilbert E. Alberding

[57] ABSTRACT

A multilayered preform is disclosed for making an open mouth container. The preform has a container-forming portion comprising a circular central area for making the bottom of the container, an annular sidewall-forming portion for the container surrounding add integral with the outer periphery of the central area, a flange connected to the annular portion, said flange having the contour of the rim of the container, said container-forming portion having a predetermined volume to meet dimensional requirements, and a retaining member having an enlarged portion. The preform is an improved structure that is readily adaptable for making containers from the so-called solid state pressure forming process.

6 Claims, 8 Drawing Figures

PREFORM STRUCTURE

BACKGROUND OF THE INVENTION

This invention relates to a perform of novel configuration and relates, more particularly, to a preform having an improved structure that is readily adaptable for forming a container made by solid state pressure techniques. The preform is further characterized by being so contoured to present a predetermined volume of polymeric material so that there is maintained not only a uniform distribution of polymeric material during container formation but that there is sufficient polymeric material to meet the dimensional requirements of the desired container.

DESCRIPTION OF THE PRIOR ART

The subject invention is an improvement over prior art preform configurations. It is well known that preforms can be injection molded from a molten polymeric material and later thermoformed into thermoplastic containers. Moreover, the forming of oriented or multilayered preforms is not readily and easily done via injection molding processes, and relatively expensive equipment may be required. Solid state forming has recently been introduced to overcome a number of these limitations.

Solid state pressure forming is a special process used to form oriented, high strength plastic containers, especially multilayered thermoplastic containers whereby barrier or gas impermeable layers may be incorporated. In general, a container is produced by forming a circular preform from a plastic chip or blank by forging the blank and immediately thereafter thermoforming the circular preform into the finished container. During the forging operation where the blank is forged into the circular preform the rim area of the final container is established and held by a gripping fixture that acts to clamp the preform in place along the rim area while the central area or ungripped area of the preform is maintained at a predetermined temperature for the subsequent molding or thermoforming operation. In thermoforming it is important that a predetermined volume of polymeric material be utilized since insufficient or excessive polymeric material would not form a properly dimensioned container. While the preform is maintained at a fixed temperature it is deformed by forcing a plunger through the unclamped portion resulting in the drawing of the polymeric material of a strictly defined volume so that the plunger forms the sidewalls and bottom wall of the container as the plunger travels therethrough of precise dimensions.

Plastic containers may be fabricated from a preform structure of the present invention by molding process such as solid state pressure technique. In a process set forth in U.S. Pat. No. 4,005,967 to Ayres, et al., a preform is forged with a finished rim and immediately thermoformed into a container. In particular, a determined amount of thermoplastic material, such as relatively thin thermoplastic blank, is formed by cutting a sheet of plastic into a plurality of polygonal blanks having a fixed size and shape. The blank is thereafter lubricated or the molds are lubricated in which the blank is to be forged. The blank is preheated to a temperature ranging from just below the softening point to about the melting point of the plastic resin and immediately forged in a heated mold into a circular shaped preform in which the center portion thereof is maintained at its forming temperature while the peripheral rim portion is quickly brought below the softening point of the plastic. The circular preform is thereafter thermoformed into a container having a desired shape.

It is in this thermoforming or molding step that the circular preform must be thoroughly secured so that no edge portion slips or leaves the gripping fixtures, resulting in defects or blemishes in the finished container. When containers are made from preforms of the subject invention, they are of improved quality and have excellent rim or flange structures that are very suitable for seaming to closures and the like.

In the aforementioned patent to Ayers, et al., several holding or retaining means are suggested for securing the preform during the molding process so that there is no pullout from the forming fixture. A number of difficulties have been experienced with these securing means. It has been found that angled barbs suggested for securing the preform are entirely unsuited to fully retain the peripheral part of the preform and as a result certain portions of the preform may slip out of the fixture due to the high forces needed in solid state pressure technique for multilayered structures. Moreover, the suggested holding means often collect a buildup of polymeric material in the recessed molding surfaces which present some difficulty in gripping preforms. Also, because of the location of the holding means being in the flange or rim area itself there has been a problem experienced in properly interlocking the flange to a closure in subsequent double seaming operations.

The process of making a sheet having a plurality of layers is well-known and described by a number of patents, including U.S. Pat. No. 3,476,627 to Squires; U.S. Pat. No. 3,479,425 to Lafevre; U.S. Pat. No. 3,557,265 to Chisholm, et al; and U.S. Pat. No. 3,959,431 to Nissel. The process of making forged preform is disclosed in U.S. Pat. Nos. 3,739,052; 3,947,204; 3,995,763 and 4,005,967 to Ayres, et al; U.S. Pat. No. 4,014,970 to Jahnle; and U.S. Pat. No. 3,757,718 to Johnson. A number of patents disclose various preform configurations that are useful for making plastic containers and include U.S. Pat. No. 3,184,524 to Whiteford; U.S. Pat. No. 3,298,893 and 3,341,644 to Allen; U.S. Pat. No. 3,471,896 to Ninneman; and U.S. Pat. Nos. 3,488,805 and 3,634,182 to Biglin, et al, as well as U.S. Pat. No. 4,286,000 to Dye, et al.

SUMMARY OF THE INVENTION

The subject invention relates to a preform configuration for making an open mouth container, said preform being substantially circular and having a central area for forming the bottom of the container, said preform having an annular sidewall forming portion for the container surrounding and integral with the outer periphery of the central area, a flange connected radially outwardly of said annular sidewall forming portion, said flange having the contour of essentially the rim portion of said container, and a retaining member integral with said flange and extending radially outwardly therefrom, said retaining member having an enlarged cross-sectional configuration as compared to the flange.

The subject invention further relates to the field in solid state pressure forming to a method of gauging a predetermined amount of polymeric material for a preform, the method which comprises providing a polymeric tabular form having a slightly larger volume than a predetermined preform configuration, forging said tabular form into a preform having the predetermined configuration whereby the preform has the necessary polymeric material within its container-forming area to meet the dimensional requirements of the container and allowing the excess polymeric material to be forced outwardly into a peripheral zone to provide an enlarged portion, said zone providing a retaining surface for said preform during the pressure forming of said container.

The present invention was developed to provide an improved preform configuration that presents to the molding surfaces a precise and predetermined volume of polymeric material to achieve dimensional requirements for a given container. Moreover, the subject preform provides an improved configuration that is readily held and secured during the molding step of the solid state forming process for fabricating plastic containers.

Accordingly, a primary object of the subject invention therefore, is to provide a simple and practical means by which a preform may be secured while being thermoformed into a container, the container meeting predetermined dimensional requirements.

Another object of this invention is to provide the in art with a preform characterized by being so contoured to present a predetermined volume of polymeric material in a solid state forming process.

Numerous other objects and advantages of the invention will be apparent as it is better understood from the following description, which, taken in connection with the accompanying drawings discloses preferred embodiments thereof.

DETAILED DESCRIPTION

Figure 1:
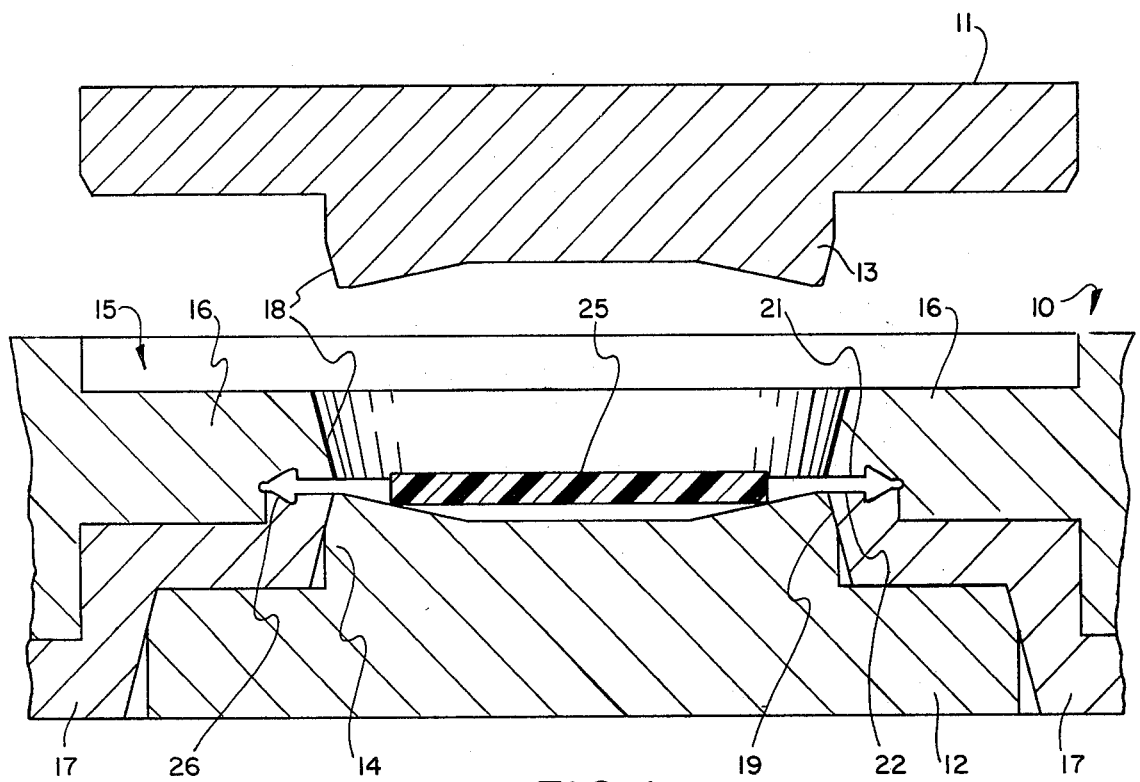
FIG. 1 is a diagrammatic, cross-sectional view of a forging press showing in place a plastic blank prior to forging.
Figure 2:
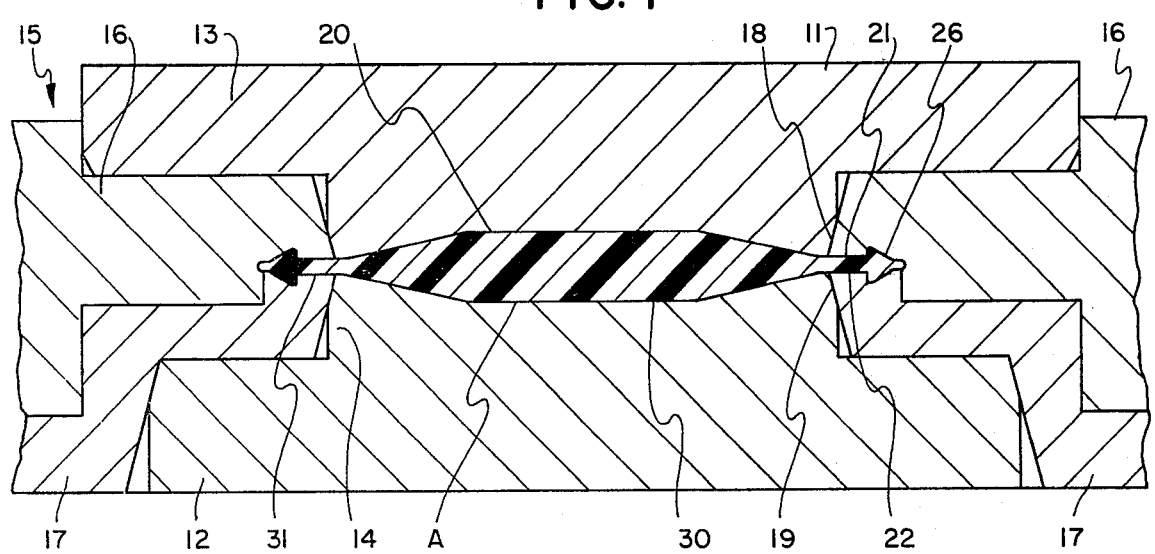
FIG. 2 is a similar view to FIG. 1 showing the relationship of parts after the blank is forged into a preform in accordance with this invention.

Referring now to the drawings and, in particular, to FIGS. 1 and 2, a forging press 10 is shown having an upper ram 11 and a lower stationary ram 12. The press 10 depicts one of the apparatus that can be used to make a plastic preform in accordance with the dimensions and design of the subject invention. The upper ram 11 may be guided by any conventional means (not shown) for reciprocation. It will be noted that the upper ram 11 is provided with an upper platen 13 integrally affixed to the ram 11 and, in a like manner, the lower stationary ram 12 is provided with a lower platen 14. Affixed to the lower platen 14 is a forming fixture 15. Although not shown in the drawings the upper and lower platens 13 and 14, respectively, are provided with conventional heating means such as steam or hot fluid-carrying channels therein. Further, the forming fixture 15 is provided with a cooling means (not shown) such as a separate conduit and circumferential channels within the fixture 15 to transport a cooling liquid therethrough.

The forming fixture 15 comprises a first clamping ring 16 and a second clamping ring 17. As for the first clamping ring 16, it is contoured at 18 to match an upper chamfered surface 18 of upper platen 13 and, in a like manner, the second clamping ring 17 is chamfered to match a lower chamfered surface 19 of the lower platen 14. Both the first and second clamping rings 16 and 17, respectively, are provided with conventional circumferential cooling channels (not shown) as previously mentioned. The first clamping ring 16 is provided with a first shoulder 21; the second clamping ring 17 is likewise provided with a second shoulder 22, said shoulders providing a rim forming portion 31 for a preform 20. Radially outward from the rim forming portion is a retaining area 26, an enlarged portion communicating with the rim portion.

FIG. 2 illustrates the forging operation whereby a plastic blank 25 is formed into the preform 20. The plastic blank 25 is converted into preform 20 within the cavity 30 defined between platens 13 and 14, the flow of the plastic material after filling the cavity 30 being outwardly towards a retaining area 26. In this manner plastic material is forced into the area 26 whereby a specific volume is retained and established for the central portion A of the preform, said portion A being substantially the container-forming portion. It will be now appreciated that retaining area 26 acts to collect a certain amount of residual plastic material upon forging of the preform to thereby insure that a precise volume is retained in the central, container-forming portion A of the preform. It can also be appreciated that the plastic material forces outwardly and into the retaining area excess polymeric material that accumulates and thereby is secured to the outer area of the forming fixture 15. In this way the preform is secured to the fixture and cannot be readily pulled away from forming fixture 15 until released by the same by opening the clamping rings 16 and 17.

Figure 3:
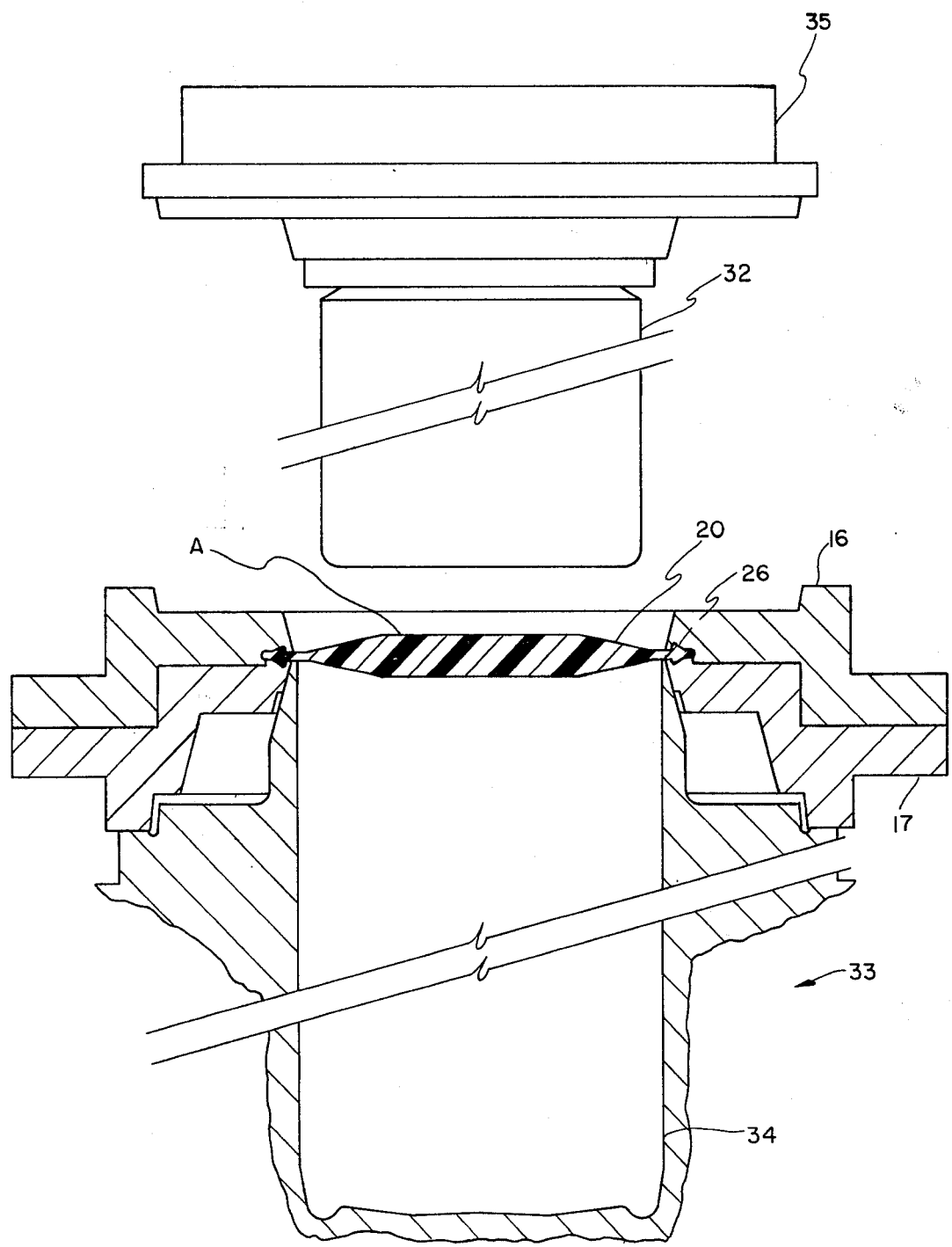
FIG. 3 is the first of a series of section views showing a method for molding the preform herein disclosed into a container, the preform being positioned between a pair of gripping members with die members associated therewith in a molding chamber prior to initiation of the molding operation.
Figure 4:
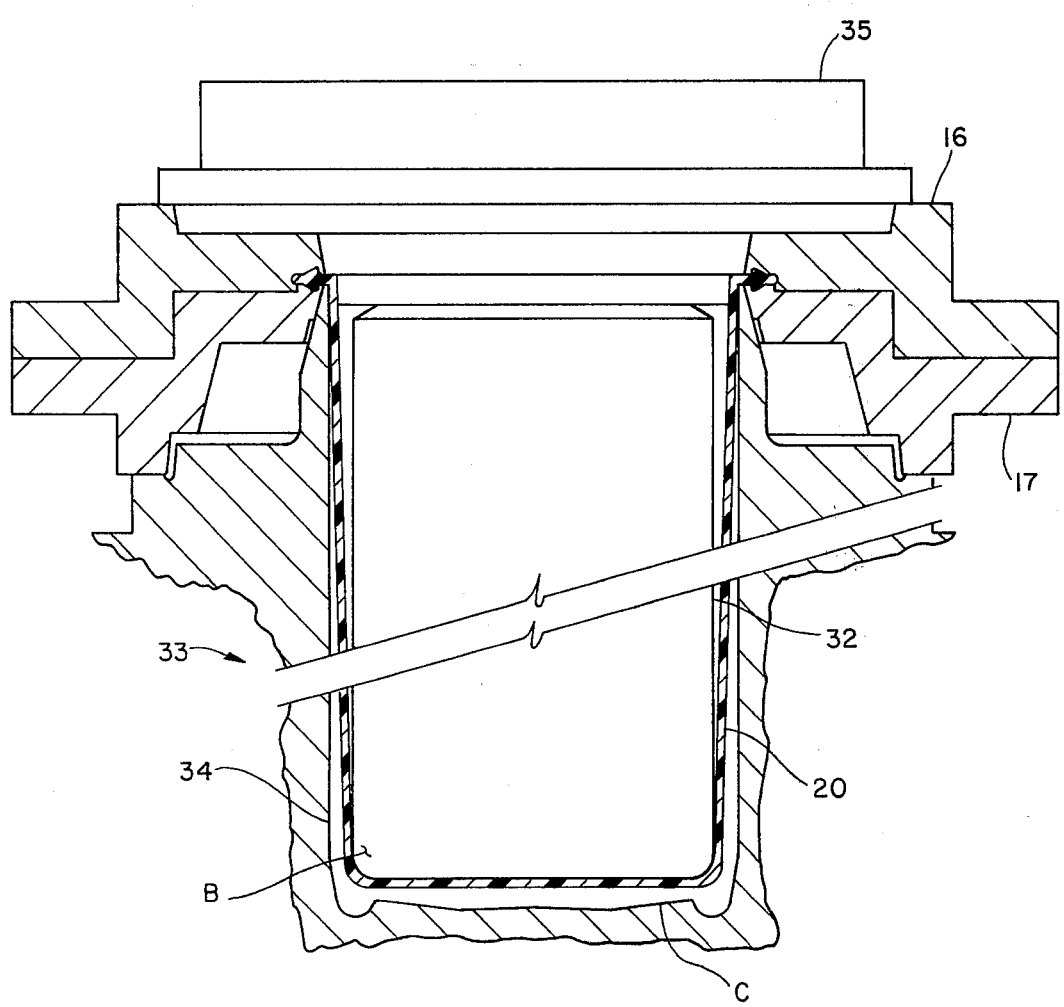
FIG. 4 depicts the die members fully advanced within the molding chamber to form a container from the preform.
Figure 5:
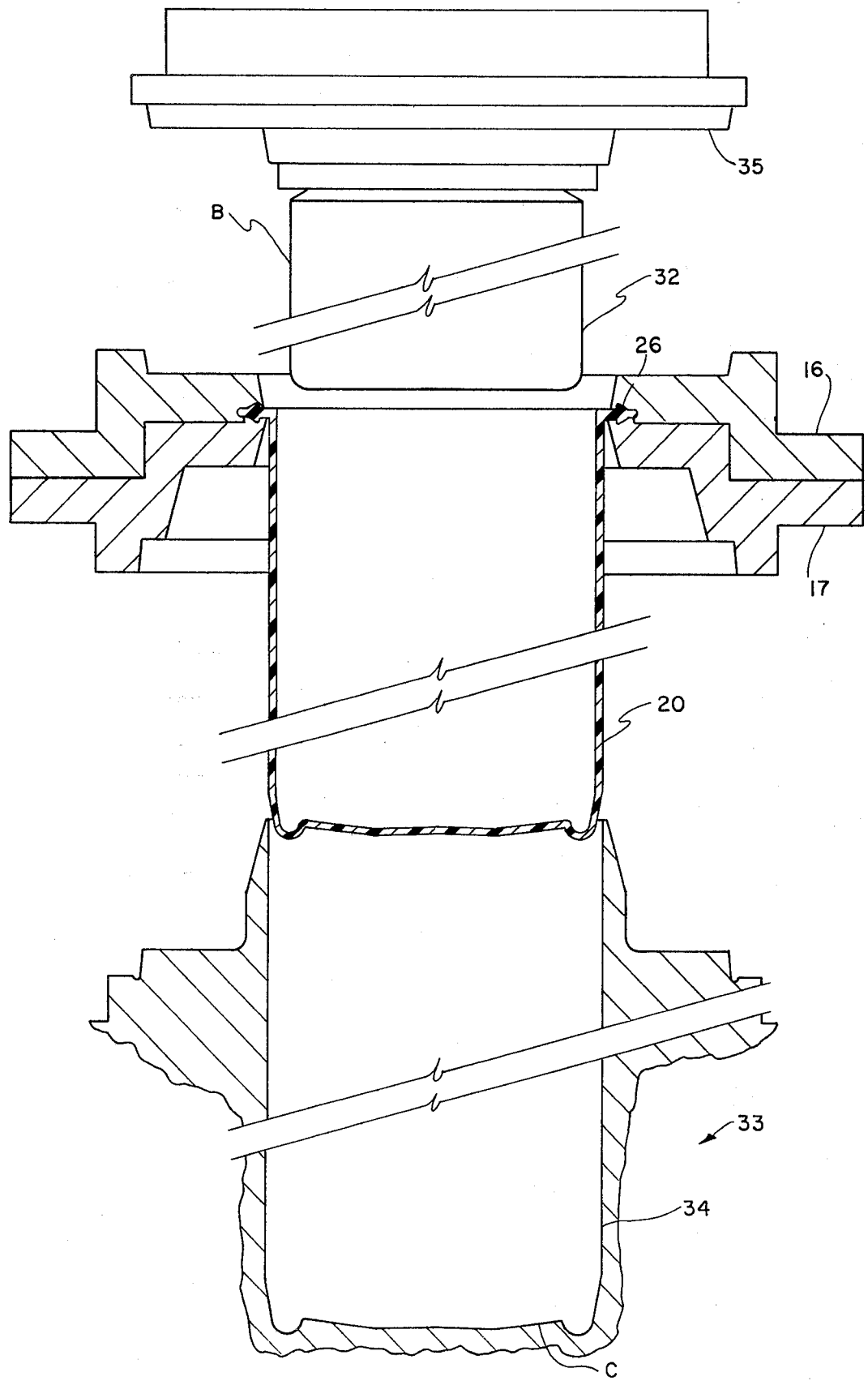
FIG. 5 illustrates the separation of the die members after fabrication of the container and immediately before ejection of the container from the molding chamber.

In preparation for the thermoforming step the platens 14 and 13 are withdrawn from the forming fixture 15 and the forming fixture 15 comprising the clamping rings 16 and 17 having the preform contained therein is then moved at once to a molding apparatus 33 wherein the molding operation is carried out by thermoforming the preform into the shape of the desired container. FIGS. 3, 4 and 5 illustrate the preform 20 being positioned into alignment with die members comprising upper plunger 32 and mold cavity 34. In particular, the upper plunger 32 is provided with a sealing member 35 which seals itself into clamping ring 16. FIG. 4 shows the member 35 advancing into the mold cavity 34 and the clamping ring 16 engaging the sealing member 35 whereby the preform 20 is stretched over the molding surface B of plunger 32 and air and vacuum means bring the preform into engagement with the base C of the mold cavity 34.

The particular configuration of the subject invention allows a multilayered profile having a precise volume to be thermoformed into a given container design. This follows from the novel structure of the preform itself in that all of the layers transverse the preform so formed and extend outermost to the extremes of the retaining section of the preform. This is of particular importance in multilayered structures wherein one layer may have a relatively slower flow rate in advancing outwardly during the forging operation. For example, certain polymers such as polyvinylidene chloride during the forging step have a somewhat slower flow rate as compared to polyolefins like polypropylene and as a result the polyolefin advances ahead to fill the outer confines of the preform cavity thereby blocking or interfering with the advance of the slower moving polyvinylidene chloride. It is of particular importance that such blockage not occur, especially in the rim forming portion of the preform. The subject invention therefore provides a means to allow such slower moving polymers to extend outwardly beyond the rim forming portion of the preform.

Figure 6:
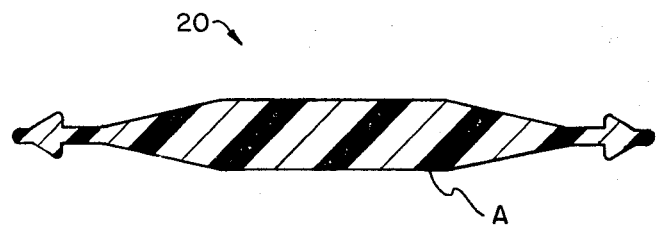
FIG. 6 is an enlarged sectional view showing the desired configuration of the preform of the subjection invention.
Figure 7:
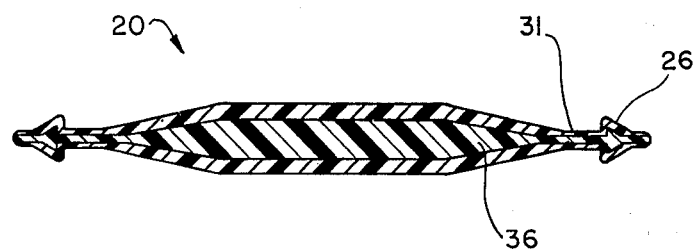
FIG. 7 is also an enlarged sectional view like FIG. 6 but having a layered structure therethrough.
Figure 8:
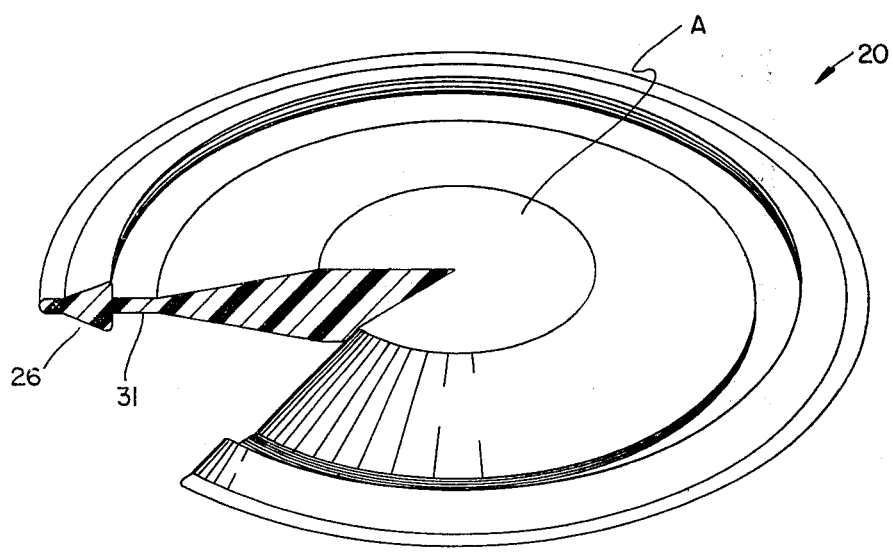
FIG. 8 is an isometric view of the preform in accordance with this invention.

Although the forging temperature is a relative term it cannot be specifically defined without considering the properties of each polymer. For a given polymeric material, optimum forging temperature can be determined in accordance with this invention. The pressure ranges used in the forging step are quite variable according to the plastic which is to be forged and to the temperature to which it is heated and to the dimensions of the cavity of the mold. The blank 25 is generally lubricated and preheated to a temperature ranging just above the softening point to below the melting point of the material, and then placed on the lower platen 14. The upper ram 11 then is allowed to descend under pressure to forge the heated blank 25 into the cavity between the platens 13 and 14 in a cavity configuration to form preforms as shown in FIGS. 6, 7 and 8. The upper and lower platens 13 and 14 are heated to a forging temperature, generally above the softening point of the material being forged. The temperature of the platens and the blank can be the same or different but it is preferred to have the platens at a slightly higher temperature than the blank. A preform made in accordance with this invention can be most readily thermoformed into an open-mouth container having uniform sidewalls and structural integrity.

The invention may be constructed of various materials. In particular, the invention is applicable to the use of a single plastic such as polyolefin, including polyethylene, polypropylene, etc., and polyvinyl aromatics such as polyesters, polystyrenes as well as polyvinyl halides such as polyvinyl chlorides. Moreover, an essential aspect of the subject invention is the structural features of the preform itself, in that it readily is formable into multilayered articles, including open-mouth containers. For example, a multilayer material may consist of polyvinyl aromatics such as styrene, polyvinyl toluene, or rubber modified blends thereof with a core 36 of polyvinylidene chloride. A further useful layer may consist of polyethylene or polypropylene with a core of polyvinylidene chloride. Containers formed with a polyvinylidene chloride layer are excellent barriers to gases such as oxygen and carbon dioxide.

It will be appreciated from the polymeric materials used and the conditions under which the preform is formed that a considerable degree of orientation is built into a given container through the forging of the preform. In a like manner when a preform is forged below the softening point of a blank, a high degree of orientation is formed in the container.

The embodiments of this invention disclosed in the drawings and specification are for illustrative purposes only, and it is to be expressly understood that said drawing and specification are not to be construed as a definition of the limits or scope of the invention, reference being made to the appended claims for that purpose.

What is claimed is:

1. A process of obtaining a predetermined volume of thermoplastic material having a multilayered structure for a container with a rim portion formed from a preform comprising the steps of providing a thermoplastic blank of material comprising layers of different polymers for said container, bringing said blank to a temperature in a range from just below the softening temperature to about the melting temperature of the material, forging said material in a forging mold provided with a container forming portion, including said rim portion and a retaining portion defined by a circumferential cavity communicating with said container forming portion and allowing said material to flow outwardly from said container forming portion into said circumferential cavity, the layers of said multilayered structure being forced beyond the rim forming portion into the retaining portion to collect residual thermoplastic material therein whereby a predetermined and specific volume is defined in said container forming portion, including said rim portion, all the layers being advanced beyond the rim forming portion of the preform into the circumferential cavity, and removing the forged preform from said forging mold.

2. A process as in claim 1 wherein the circumferential cavity is an enlarged member having a substantially a triangular cross-sectional configuration.

3. A process as in claim 1 wherein the layers of the multilayered structure are advancable at different rates upon being forged.

4. A process as in claim 3 wherein at least one thermoplastic material flows at a slower rate upon forging than the other layers of said multilayered structure.

5. A process as in claim 3 wherein at least one thermoplastic material is polyvinylidene chloride.

6. A process as defined in claim 1 wherein the preform is formed into a multilayered container.

* * * * *